United States Patent [19]

Lockett et al.

[11] Patent Number: 5,076,599
[45] Date of Patent: Dec. 31, 1991

[54] CONVERTIBLE STROLLER AND TRAILER COMBINATION

[75] Inventors: Dennis Lockett, Pueblo; James T. Hruby, Rye; John G. Roth, Pueblo, all of Colo.

[73] Assignee: HLR, Inc., Pueblo, Colo.

[21] Appl. No.: 590,146

[22] Filed: Sep. 28, 1990

[51] Int. Cl.⁵ .......................................... B62K 27/00
[52] U.S. Cl. ................................. 280/204; 280/32.7; 280/657; 280/47.18; 280/47.25; 280/643
[58] Field of Search ................ 280/204, 32.7, 656, 280/657, 658, 659, 87.021, 87.041, 47.18, 47.25, 47.34, 47.371, 47.38, 31, 643

[56] References Cited

U.S. PATENT DOCUMENTS

| | | | |
|---|---|---|---|
| 241,148 | 5/1881 | Marsh | 280/47.18 |
| 2,798,727 | 7/1957 | Jensen et al. | 280/47.18 X |
| 3,887,208 | 6/1975 | Vidal | 280/47.25 X |
| 4,729,574 | 3/1988 | Tipke | 280/47.18 X |
| 4,848,780 | 7/1989 | Straub | 280/47.25 X |
| 4,953,880 | 9/1990 | Sudakoff et al. | 280/658 X |

FOREIGN PATENT DOCUMENTS

| | | | |
|---|---|---|---|
| 967288 | 10/1950 | France | 280/204 |
| 152970 | 1/1956 | Sweden | 280/204 |

*Primary Examiner*—Charles A. Marmor
*Assistant Examiner*—Alan M. Kagen
*Attorney, Agent, or Firm*—Donald W. Margolis; Edwin H. Crabtree

[57] ABSTRACT

A convertible combined stroller and trailer which can be changed from a stroller mode to a trailer mode and vice versa. When the vehicle is in either the stroller mode or trailer mode it includes a flexible seat for one or more passenger. When used in a stroller mode, rear wheels are attached to the opposite sides of the rear of the frame at a position called "Position S" and front wheels are attached to the opposite sides of the front of the frame. At this position the load on the frame is distributed evenly on the rear wheels and on the front wheel. When the vehicle is in a trailer mode the front wheels are removed, the rear wheels are moved from the "Position S" to a position forward and upward on the sides of the frame called "Position T", and one end of a tow bar is attached to the front of the vehicle frame. Another end of the tow bar is attached to the rear of a towing vehicle, such as a bicycle frame. In the trailer mode the load on the frame is evenly distributed on the rear tires, while the front of the frame and tow bar carry very little load. This is due to the face that the center of gravity of the trailer is closer to a ground surface for improved stability when operating in various types of terrain and during sharp turns.

18 Claims, 3 Drawing Sheets

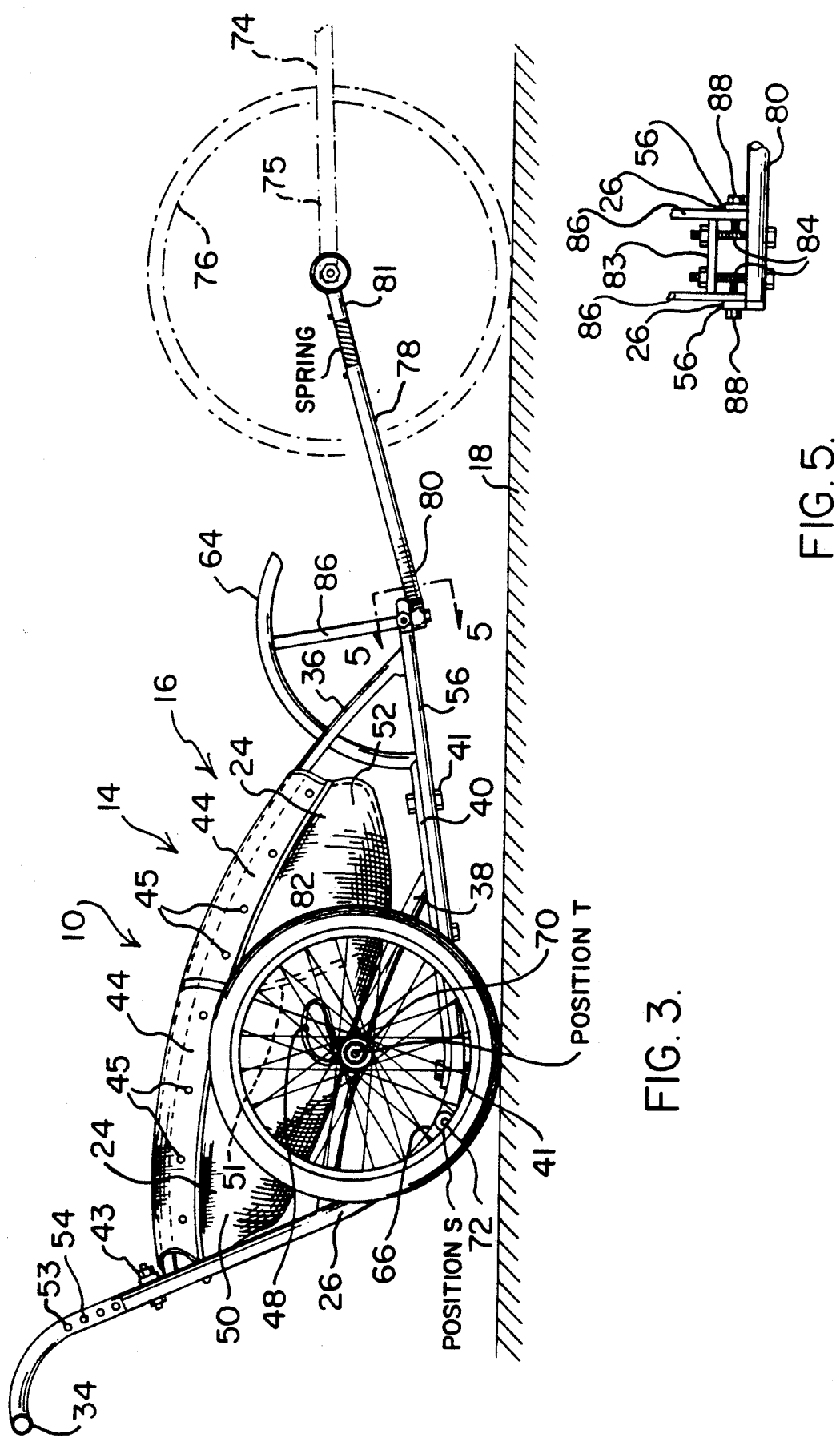

CONVERTIBLE STROLLER AND TRAILER COMBINATION

BACKGROUND OF THE INVENTION (a) Field of the Invention

This invention relates to a convertible child stroller and trailer combination, herein called stroller/trailer, where in one mode the invention is a child stroller having both forward and rearward wheels for transporting one or more child over various types of terrain, while in a second mode the invention is a trailer having a front tow bar attached to one end and having only one set of wheels which are positioned to provide a stable center of gravity when the vehicle is towed.

(b) Discussion of the Prior Art

Heretofore there have been a variety of child strollers, baby carriages, and different types of trailers for mounting to the rear of bicycles and motorcycles. During the past thirty years, with the growth of outdoor activities in the United States, more and more people are inclined to take babies and young children on hikes, running, jogging, and camping. Prior art strollers and baby carriages, with small hard rubber wheels, are not suited to these types of activities and are limited to sidewalks and flat hard surfaces. Recently, for avid runners and joggers, a three-wheeled stroller with bicycle tires is available. In this instance a mother or father can continue to run or jog at a proper pace while pushing the stroller with child therein. But, this type of stroller is not convertible to a trailer nor is it adaptable to be pulled behind a bicycle.

In U.S. Pat. No. 1,633,086 to Fox, a two-wheeled trailer is shown having a frame adaptable for attachment to the rear of a motorcycle frame. U.S. Pat. No. 3,993,321 to Cote discloses a frame for mounting around the sides of the rear wheel of a bicycle and including a ball hitch for connecting to a trailer or the like. U.S. Pat. No. 4,725,067 to Lundy also discloses a two-wheeled trailer, but this trailer is adapted for attachment to the rear of a bicycle frame only. None of the above patents disclose the unique features and advantages of the subject invention.

U.S. Pat. No. 2,482,585 to Hauptman describes a combination bicycle and baby carriage. The front of the bicycle is removed and the rear of the bicycle with seat is coupled to a baby carriage. By riding the bicycle and holding onto the handle of the carriage, the carriage is propelled down a path or sidewalk. French Patent 967,288 to Bidet is of particular interest and discloses an old-time baby carriage with a foldable handle. By raising the handle and folding it over the top of the carriage, the rear wheels in turn are raised upwardly. A trailer hitch is attached to the rear of the carriage. When the rear wheels are in a raised position, the carriage can be hitched to a towing vehicle and pulled there behind. Neither of the above-mentioned patents describe or disclose teachings similar to the subject stroller/trailer and its unique features and modes of operation as described herein.

SUMMARY OF THE INVENTION

In view of the foregoing, it is an object of the present invention to provide a stroller vehicle that can be quickly converted to a bicycle trailer and vice versa.

Another object of the invention is to provide a lightweight, streamlined stroller and trailer combination that is rugged in construction and can be used in all types of terrain for various activities.

Another object of the invention is to provide a stroller and trailer combination vehicle in which there is equal load distribution on the wheels during either mode of use.

Still another object of the invention is to lower the center of gravity for improved stability when the invention is used as a bicycle trailer by moving the location of the rear wheels forward and upward on the frame.

Still another object of the invention is to reduce the load on the front of the trailer and tow bar by moving the location of the rear wheels forward and upward on the frame.

Another object of the invention is to provide a flexible seat for holding one or more children.

Yet another object of the invention is to provide such a combination vehicle having a collapsible frame which allows for ease in storing or transporting the vehicle.

The present invention as disclosed herein includes a convertible combined stroller and trailer, herein sometimes called stroller/trailer, which can be changed from a stroller mode to a bicycle trailer mode and vice versa. When the stroller/trailer vehicle is in either the stroller mode or trailer mode it normally includes a flexible cloth seat for seating one or more child therein. The seat is secured to a tubular frame. When used in a stroller mode, rear wheels are attached to the opposite sides of the rear of the frame at a position called "Position S", as defined in greater detail below, and front wheels are attached to the opposite sides of the front of the frame. At this position the load on the frame is distributed evenly on the rear wheels and on the front wheel. When the stroller/trailer is in a trailer mode the front wheels are removed, the rear wheels are moved from the "Position S" to a position forward and upward on the sides of the frame called "Position T", and one end of a tow bar is attached to the front of the vehicle frame. Another end of the tow bar is attached to the rear of a towing vehicle, such as a bicycle frame. In the trailer mode the load on the frame is evenly distributed on the rear tires, while the front of the frame and tow bar carry very little load. This is due to the fact that the center of gravity of the trailer is closer to a ground surface for improved stability when operating in various types of terrin and during sharp turns.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 3 is a side view illustration of the stroller/trailer in a trailer mode with a front wheel removed, a tow bar attached to the front of a frame and to the rear of a bicycle, and a pair of rear wheels moved forward and upward on the frame for improved balance and load distribution;

FIG. 5 is a sectional view taken along lines 5—5 shown in FIG. 3 of a portion of the tow bar attached at one end to the front of the frame.

DETAILED DESCRIPTION OF THE PREFERRED EMBODIMENT

Figure 1:
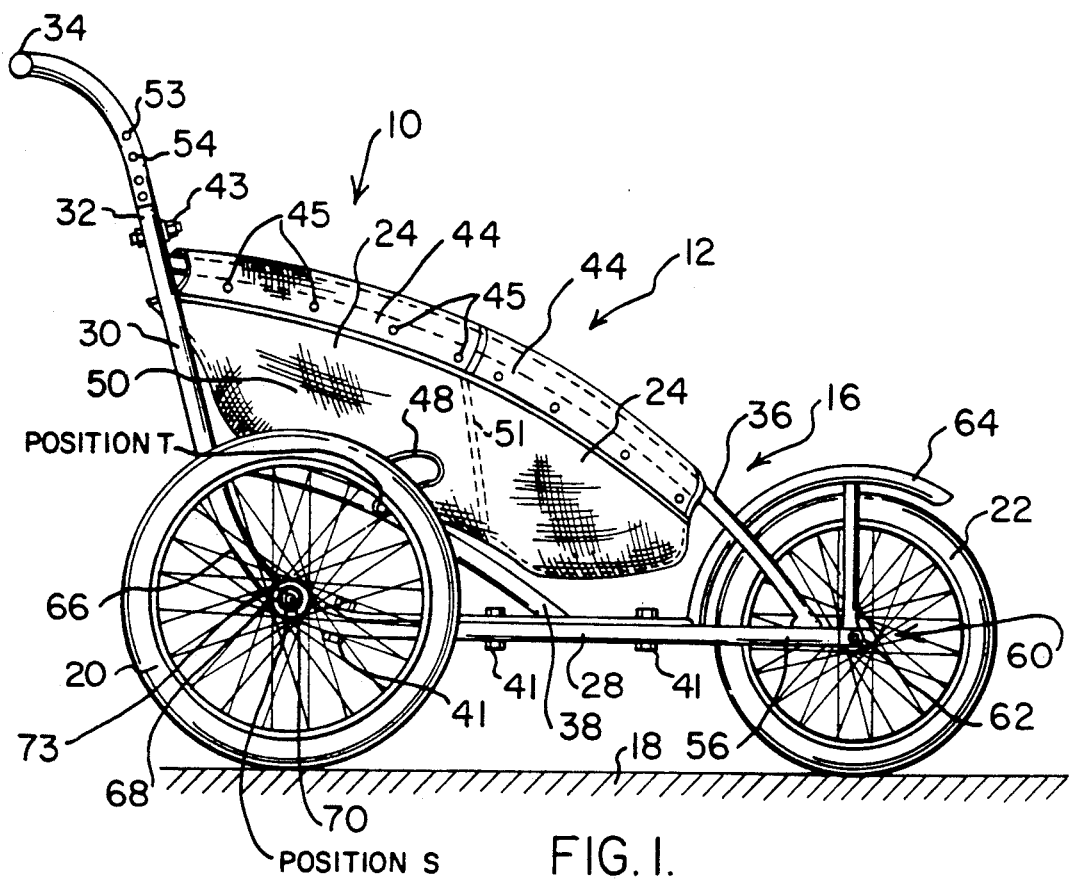
FIG. 1 is a side view illustration of the stroller/trailer and shown in a stroller mode for transporting one or more children therein by pushing the stroller from behind.
Figure 2:
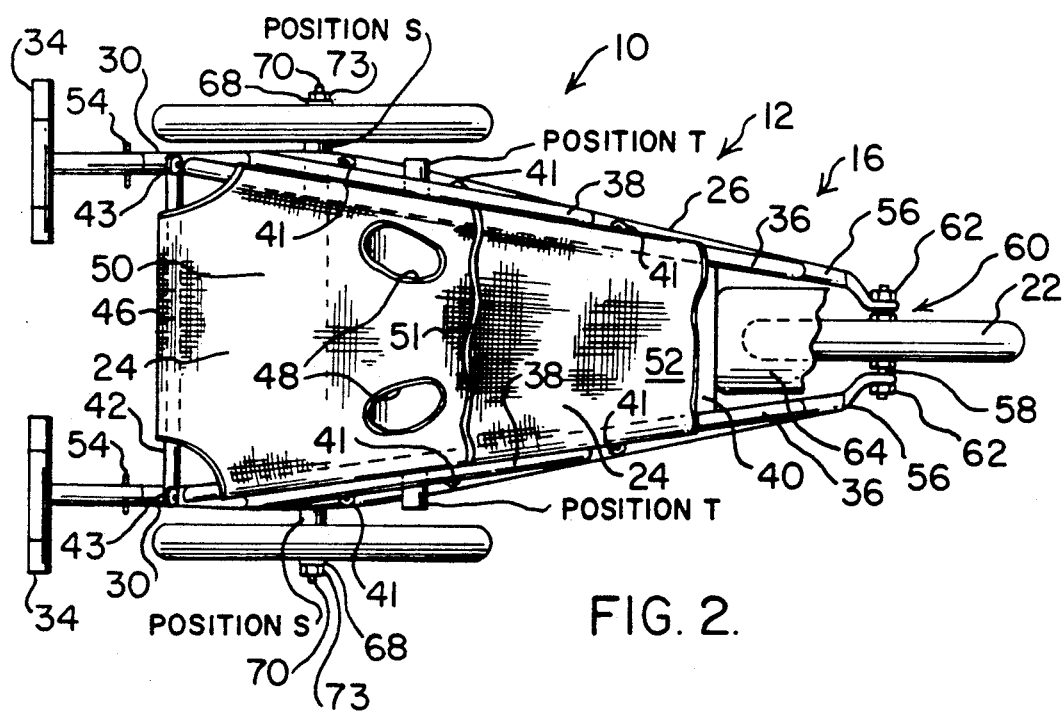
FIG. 2 is a top view illustration of the stroller/trailer in a stroller mode as shown in FIG. 2.
Figure 4:
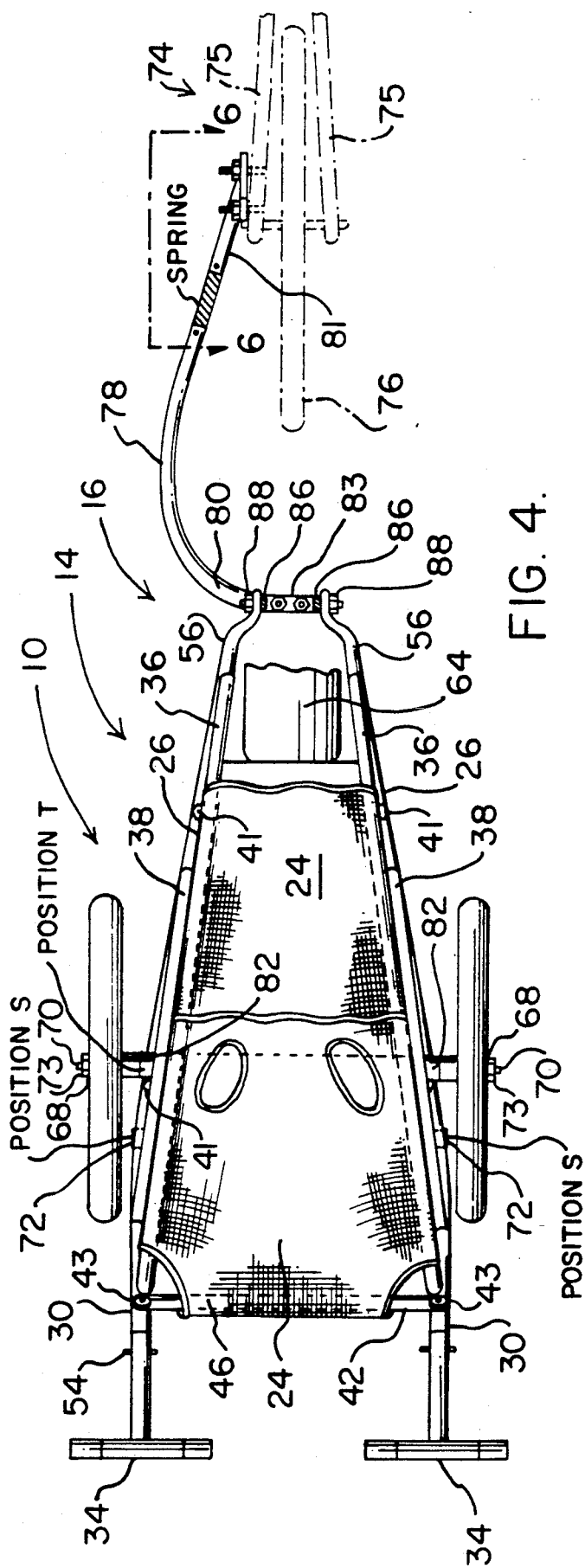
FIG. 4 is a top view illustration of the stroller/trailer in a trailer mode as shown in FIG. 3.

Referring initially to FIG. 1 through FIG. 4 the preferred embodiment of the convertible child combined stroller and trailer of the present invention and herein called stroller/trailer is given the general reference number 10. In FIG. 1 and FIG. 2 the stroller/trailer 10 is illustrated in a stroller mode. In this instant the stroller is given the reference number 12. In FIG. 3 and FIG. 4 the stroller/trailer 10 is illustrated in a trailer mode. In this format the trailer is given the reference number 14.

In FIG. 1 and FIG. 2 a side and top view of the stroller is shown having a tubular frame 16 which is supported on a ground surface 18 by a pair of rear wheels 20 and a front wheel 22. A flexible cloth seat 24 is releasibly attached to the frame 16 for holding one or more children therein.

The frame 16 includes a pair of parallel curved "L" shaped side bars 26. A horizontal portion 28 of the side bars 26 is used for securing the wheel 22 to the frame 16. An angled portion 30 of the side bars 26 is at an approximate 11 o'clock position as shown in FIG. 1 with upper ends 32 having handles 34 attached thereto. The side bars 26 also include a semi-circular seat support bar 36 and a semi-circular trailer bushing support bar 38. One end of the bars 36 and 38 are attached to the horizontal portion 28 of the side bars 26 and the opposite end of the bars 36 and 38 attached to the angled portion 30 of the side bars 26. The two side bars 26 are joined together to reinforce the strength of the frame 16 by a horizontal foot rest plate 40 attached to the horizontal portion 28 of the side bars 26 by bolts 41. A horizontal cross-support bar 42 is attached at opposite ends to the angled portion 30 of the sides bars 26 by bolts 43 thus completing the frame 16. The cross-support bar 42 can be seen more clearly in FIG. 2. The cross-support bar 42 is used to help secure and suspend the seat 24 on the frame 16. By removing the bolts 41 and 43 the frame 16 can be quickly collapsed for ease in storage when the stroller 12 is no longer needed.

The seat 24 shown in FIG. 1 and FIG. 2 includes sides 44 and an upper end 46, shown in FIG. 2, which are folded over the top of the seat support bars 36 and the cross-support bar 42 and secured thereto by snaps 45. A pair of leg holes 48 are formed in an upper compartment 50 of the seat 24. The upper compartment 50 can be used by an older child with the leg holes 48 allowing him to insert his legs therethrough with his feet resting on top of the foot rest plate 40. The trailer bushing support bars 38 are not only used to mount bushings thereon but help prevent a child's foot from engaging the rear wheels 20. A lower compartment 52 of the seat 24 is disposed at the front of the frame 16 and it is designed for holding an infant therein. The lower compartment 52 is separated from the upper compartment 50 by a divider 51. While seat belts are not shown in the drawings, it is certainly desirable to have belts in both of the compartments 50 and 52 for the protection of the children. Also while the seat 24 is shown with two compartments for holding two children, one in front of the other, it can be appreciated that a variety of different designs of seats can be used equally well with the stroller 12 and the trailer 14.

The handles 34 as shown in the drawings are adjustable along the length of the upper end 32 of the angled portion 30 of the side bars 26. A plurality of holes 53 are placed in a portion of the handle 34 and in the upper end 32. By telescoping the handles 34 up or down and indexing the holes 53, a pin 54 is inserted into the indexed holes 53. This adjustment of the two handles 34 allows for a proper height when pushing the stroller 12.

Referring now to the front wheel 22 as shown in FIG. 1 and FIG. 2. The front wheel 22 is secured to a front portion 56 of the side bars 26 where a spindle shaft 58 of a hub 60 of the front wheel 22 extends outwardly and held in place using threaded nuts 62. By loosening the nuts 62, the front wheel 22 can be quickly removed as it is moved forward away from the frame 16. A fender 64 is attached to the front portion 56 of the side bars 26 and disposed above and to the rear of the front wheel 22 to protect the children riding in the stroller 12 or trailer 14 from flying debris kicked up from the ground surface 18. In FIG. 2 the front of the fender 64 has been cut away to illustrate how the front wheel 22 is attached to the side bars 26.

The rear wheels 20 shown in FIG. 1 and FIG. 2 are attached to a bend portion 66 of the side bars 26 where the horizontal portion 28 curves into the upwardly angled portion 30. The rear wheels 20 include a hub 68 with a spindle shaft 70 inserted into a bushing 72 mounted in the bend portion 66. Threaded nuts 73 secure the shaft 70 to the bushing 76. The nuts 73 next to the inside of the bushing 72 are not shown in the drawings.

When the rear wheels 20 are attached to the bushings 72 as shown in FIG. 1 and FIG. 2, the wheels 20 are in a position called "Position S" with the "S" for the Stroller mode. In "Position S" the rear wheels 20 co-act with the front wheel 22 in distributing the load equally from the frame 16 to the ground surface 18 for ease in pushing the stroller 12 with the children riding therein.

Referring to FIG. 3 and FIG. 4 the stroller/trailer 10 is shown in a trailer mode as trailer 14. The front wheel 22 has been removed from the front portion 56 of the side bars 26. The trailer 10 is now connected to a bicycle 74 using a tow bar 78. The tow bar 78 is attached to a bicycle frame 75 with a bicycle wheel 76 mounted thereon. The bicycle 74 with frame 75 and wheel 76 are shown in dotted lines and are not part of the subject invention although the bicycle 74 is used for pulling the trailer 10 when used in a trailer mode. A first end 80 of the tow bar 78 is attached to the front portion 56 of the side bars 26 and this attachment is shown in the discussion of FIG. 5. A second end 81 of the tow bar 78 is clamped to the side of the bicycle frame 75 and is described in the discussion of FIG. 6.

The rear wheels 20 as shown in FIG. 3 and FIG. 4, when in a trailer mode, are moved forward and upward in a lower and central position on the frame 16 and attached to bushings 82 on each of the trailer bushing support bars 38. The spindle shafts 70 of the rear wheels 20 are inserted through the bushings 82 and secured thereto by nuts 73. The nuts 73 on the inside of the bushings 82 are not shown in the drawings. The position of the rear wheels 20 are in a "Position T" with the "T" for trailer mode. It should be noted that in "Position T" the center of gravity has been lowered for improved balance of the trailer 14 when traveling over rough terrain and around sharp turns. Also with the wheels 20 in this position, the weight from the frame 16 is distributed evenly onto the wheels 20 for ease in transporting children when the trailer 14 is pulled by the bicycle 74. Further by moving the wheels 20 any load on the front of the frame 16 and the tow bar 78 is reduced.

In FIG. 5 a more detailed view of the first end 80 of the tow bar 78 is shown and taken along lines 5—5 shown in FIG. 3. The first end 80 includes a standard attachment device having a spacer bar 83 disposed between the ends of the front portion 56 of the side bars 26. The spacer bar 83 is attached to the first ends 80 of the front portion 56 of the side bars 26. The spacer bar 83 is attached to the first end 80 of the tow bar 78 by a pair of threaded bolts 84. A pair of attachment ears 86 with threaded bolts 88 are used to compress the front portions 56 of the side bars 26 against the ends of the spacer bar 83 thus securing the tow bar 78 to the frame 16.

Figure 6:
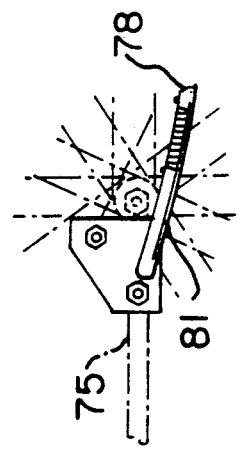
FIG. 6 is a sectional view taken along lines 6—6 shown in FIG. 4 of a portion of the tow bar used for securing the tow bar to the rear of the bicycle frame.

In FIG. 6 a more detailed view of the second end 81 of the tow bar 78 is shown and taken along lines 6—6 shown in FIG. 4. The second end 81 also includes a standard attachment device having a clamp plate 90 attached to the end of the second end 81 and a pair of "J" shaped clamps 92. The "J" portion of the clamps 92 are positioned around a part of the bicycle frame 75. The clamps 92 are held thereon by a pair of nuts 94 threaded on the ends of the clamps 92 and against the clamp plate 90. The clamp plate 90 is pressed against the side of the bicycle frame 75 thereby securing the tow bar 78 to the bicycle 74.

In the operation of the stroller/trailer 10, two modes can be chosen as discussed above. When in a stroller mode the stroller 12 includes both the rear wheels 20 and front wheels 22 with the load from the seat 24 and the frame 16 distributed evenly on the three wheels. By adjusting the handles 34 on the side bars 26 to a proper height for the person propelling the stroller 12, the stroller 12 can be easily transported over various types of terrain. Also it should be noted that the tires 20 and 22 can be bicycle tires of various dimensions; for example, in a range of 16 to 20 inches in diameter, for improved speed of the stroller 12 when compared to the smaller hard rubber type wheels typically used on older models of strollers and baby carriages. Also the tires 20 and 22 can be a wide tube type tire with knobby tire tread, as used on modern trail bicycles, for improved stability and ease in traversing rough terrain during off road use.

When it is desired to convert to a trailer mode, the stroller 12 is changed to a trailer 14 by loosening the nuts 62 and removing the front wheel 22 from the front portion 56 of the side bars 26. The side bars 26 are then secured to the first end 80 of the tow bar 78 using the spacer bar 83 and attachment ears 86. At the same time the rear wheels 20 are removed from "Position S" by loosening the nuts 73 and moving the wheels 20 to "Position T" where the wheels are secured to the frame 16 using the nuts 73. The tow bar 78 is then attached to the bicycle 74 using the clamp plate 90 and the "J" shaped clamps 92. The trailer 14 is now ready for being pulled by the bicycle 74 with the rear wheels 20 at "Position T" for lowering the center of gravity of the trailer 14 and reducing the load on the front of the trailer 14 and the tow bar 78. While the above operation of changing the stroller 12 to the trailer 14 is described, it can be appreciated that the trailer 14 can just as easily be returned to a carrier 12 by reversing the above operational steps.

While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A combination vehicle having a plurality of movable and removable wheels, which vehicle is capable of being used in a stroller mode and which is capable of being converted to a trailer mode and back again to a stroller mode, the combination comprising:
 a frame, said frame including;
  a. a pair of sides;
  b. means for rigidly connecting said pair of sides in substantially parallel, spaced apart opposed relation to one another;
  c. each said opposed side having;
   i. a front end;
   ii. a rear end;
   iii. a top member running substantially between said front end and said rear end;
   iv. a bottom member running substantially between said front end and said rear end;
   v. an intermediary member located between said top member and said bottom member, and including a portion located forwardly and upwardly from said rear end and said bottom member;
   vi. a front end mounting location proximate said front end for mounting a front wheel to said frame when said frame is being utilized as a portion of a stroller, and for receiving a tow bar when said frame is being utilized as a trailer;
   vii. a first rear wheel mounting location proximate said bottom member and said rear end for mounting a wheel is thereon, and which, when a wheel is thereon, and on said front end mounting and receiving location, provides a stable center of gravity to the frame and any occupants when said frame is being utilized as a portion of a stroller; and
   viii. a second rear wheel mounting location carried by said intermediary and located forwardly and upwardly from said first wheel mounting location, which, when a wheel is mounting thereon, and a tow bar is received by said front end mounting and receiving location, provides a stable center of gravity to said frame and any occupants when said frame is being utilized as a portion of a trailer;
whereby said frame may be utilized as a component in a vehicle which is capable of being used in a stroller mode and which is also capable of being converted to a trailer mode for connection with a trailer bar, and back again to a stroller mode.

2. The combination vehicle as described in claim 1 further including a pair of rear wheels, said rear wheels mounted at said first rear wheel mounting location on each said side of said frame, and a front wheel mounted at said front end mounting and receiving location when said combination vehicle is being utilized as a stroller.

3. The combination vehicle as described in claim 2 further including a handle attached to the vehicle proximate said top member and said rear of said frame for pushing the combination vehicle when said frame is being utilized as a portion of a stroller.

4. The combination vehicle as described in claim 1 further including a pair of rear wheels, said rear wheels mounted at said second rear wheel mounting location carried by said intermediary member and located forwardly and upwardly from said first rear wheel mounting location, which, when a tow bar is received by said front end mounting and receiving location, provides a stable center of gravity to said frame and any occupants when said combination vehicle is utilized as a trailer.

5. The combination vehicle as described in claim 1 further including means connected to said frame for supporting a seat for holding at least one passenger therein.

6. The combination vehicle as described in claim 5 wherein said frame includes a foot rest plate carried by said bottom member to thereby provide a rest for the feet of a passenger riding in said seat.

7. The combination vehicle as described in claim 5 wherein the seat is composed of flexible material.

8. The combination vehicle as described in claim 1 further including means connected to said frame for supporting a seat for holding two passengers, one behind the other from said front end of said frame to said rear end of said frame, therein.

9. A convertible stroller and trailer combination vehicle which can be converted from a stroller mode to a trailer mode for use with a tow bar, said combination vehicle comprising:
a seat for holding at least one child therein;
a frame, said frame including means for supporting said seat, said frame having a pair of opposed sides, a front end and rear end, and a top side and a bottom side, each said opposed side having two positions for mounting wheels thereon, a first position near the rear end and bottom side of the frame and a second position forward and upward from said first position and in a lower center position on said frame;
a pair of rear wheels mounted at said second position on said frame when said combination vehicle is used in a trailer mode, to thereby provide a stable center of gravity to the vehicle and any occupants; and
means for attaching a tow bar to said front of said frame when said combination vehicle is used in a trailer mode, and for attaching a wheel when said combination vehicle is used in a stroller mode.

10. The combination vehicle as described in claim 9 wherein said frame includes a foot rest plate mounted at said bottom side of frame and attached to said opposite sides of said frame.

11. The combination vehicle as described in claim 9 wherein said seat is composed of flexible material for holding at least one child therein.

12. A converible stroller and trailer combination, which can be changed from a stroller mode to a trailer mode, the combination comprising:
a flexible seat for holding at least one child therein;
a frame supporting said seat, said frame including a pair of parallel side bars, each said side bar having a first means for receving a wheel thereon in a first position, and a second means for receiving a wheel thereon in a second position, having a forward horizontal portion, a bend portion, and an angled portion extending upwardly and rearwardly from the bend portion, said side bars further including a semi-circular seat support bar with one end attached to said horizontal portion and another end of said seat support bar attached to said angled portion, said side bars also including a semi-circular trailer bushing support bar with one end attached to said horizontal portion and another end attached to said angled portion of said side bars, said seat attached to and suspended from the cross-support bar and seat support bars;
a foot rest plate having opposite sides attached to said horizontal portion of said side bars;
a pair of rear wheels attached to said first means for receiving a wheel in a first position at said bend portion of said side bars when the combination vehicle is in a stroller mode, to thereby provide a stable center of gravity to the vehicle and any occupants; and
a front wheel attached to a forward end of said horizontal portion of said side bars when the combination vehicle is in a stroller mode.

13. The combination vehicle as described in claim 12 further including adjustable handles mounted on an upper end of said angled portion of said side bars, said handles used for pushing the vehicle in the stroller mode.

14. The combination vehicle as described in claim 12 wherein said flexible seat has two compartments therein for holding two children with one of the compartments having leg holes therein so that the legs of a child can be inserted therethrough and rest on said foot rest plate.

15. The combination vehicle as described in claim 12 wherein said flexible seat has an upper portion which is folded over said cross-support bar and seat support bars and snapped together with snaps for suspending said seat therefrom.

16. The combination vehicle as described in claim 12 further including a fender attached to said horizontal portion of said side bars and disposed around a portion of said front wheel.

17. A convertible stroller and trailer vehicle combination which can be changed from a stroller mode to a trailer mode, the combination vehicle comprising:
a flexible seat for holding at least one child therein;
a tubular frame including a pair of parallel side bars, said side bars having a forward horizontal portion, said side bar having a first means for receiving a wheel thereon in a first position, and a second means for receiving a wheel thereon in a second position, said second means for receiving a wheel thereon at a bend portion, and an angled portion extending upwardly and rearwardly from said bend portion, said side bars further including a semi-circular seat support bar with one end attached to said horizontal portion and another end attached to said angled portion, said side bars also including a semi-circular trailer bushing support bar with one end attached to said horizontal portion and another end attached to said angled portion and having a bushing thereon, a cross-support bar having opposite ends attached to said angled portion of said side bars, said seat attached to and suspended from said cross-support bar and seat support bars, and a foot rest plate having opposite sides attached to said horizontal portion of said side bars;

a pair of rear wheels attached to said second means for receiving wheels in a second position on said trailer bushing support bars of said side bars, when the combination vehicle is in a trailer mode; and a tow bar attached to a foward end of said horizontal portion of said side bars, thereby allowing said combination vehicle to be utilized in a trailer mode.

18. The combination vehicle as described in claim 17 wherein said flexible seat has two compartments therein for holding two children with one of said compartments having leg holes therein so that the legs of a child can be inserted therethrough and rest on said foot rest plate.

* * * * *